United States Patent
Durham et al.

(10) Patent No.: US 11,040,590 B2
(45) Date of Patent: Jun. 22, 2021

(54) SUSPENSION LOWERING SYSTEM FOR VEHICLE TRANSPORT

(71) Applicant: Battelle Memorial Institute, Columbus, OH (US)

(72) Inventors: Jerry L. Durham, Bexley, OH (US); Gaymon M. Davis, Columbus, OH (US); Kurt R. Ramsey, Powell, OH (US); Mark J. Soper, Hilliard, OH (US); Michael Perry, Pataskala, OH (US); Arthur A. Horinek, Powell, OH (US); Kevin A. Chilcote, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 346 days.

(21) Appl. No.: 15/604,216

(22) Filed: May 24, 2017

(65) Prior Publication Data
US 2017/0334262 A1 Nov. 23, 2017

Related U.S. Application Data

(60) Provisional application No. 62/340,402, filed on May 23, 2016.

(51) Int. Cl.
*B60G 17/02* (2006.01)

(52) U.S. Cl.
CPC ...... *B60G 17/023* (2013.01); *B60G 2202/112* (2013.01); *B60G 2202/43* (2013.01); *B60G 2204/121* (2013.01); *B60G 2204/4232* (2013.01); *B60G 2204/47* (2013.01); *B60G 2204/61* (2013.01); *B60G 2206/601* (2013.01); *B60G 2300/024* (2013.01); *B60G 2300/026* (2013.01); *B60G 2500/30* (2013.01); *B60G 2800/20* (2013.01)

(58) Field of Classification Search
CPC ............ B60G 17/023; B60G 2204/121; B60G 2204/4232; B60G 2204/47; B60G 2500/30
See application file for complete search history.

(56) References Cited

U.S. PATENT DOCUMENTS

| | | | | |
|---|---|---|---|---|
| 1,862,172 A | * | 6/1932 | Bennett | B25B 27/308 29/230 |
| 1,881,050 A | * | 10/1932 | Grant | B25B 27/308 254/10.5 |
| 1,984,694 A | * | 12/1934 | Nottoli | B60G 3/01 267/68 |

(Continued)

*Primary Examiner* — Faye M Fleming
(74) *Attorney, Agent, or Firm* — Fay Sharpe LLP

(57) ABSTRACT

A method and apparatus for lowering the height of a wheeled vehicle for cargo height constraints during transportation. The rear leaf spring shackle on each side of the vehicle is connected to a sliding frame mount. In the transport configuration, fasteners are removed from the sliding frame mount, and the mount slides forward, rotating the rear leaf spring shackle from a near vertical to a near horizontal position, effectively lowering the height of the vehicle. To return the vehicle to the ride configuration, a screw jack member is attached to the sliding frame mount and a rear attachment point on the vehicle, pulling the sliding frame mount back, aligning attachment points of the mount with the frame member in the original position. The fasteners are reinstalled to lock the sliding frame mount into the ride configuration.

18 Claims, 22 Drawing Sheets

(56) References Cited

U.S. PATENT DOCUMENTS

| | | | | |
|---|---|---|---|---|
| 2,039,489 A | * | 5/1936 | Messick | B60F 1/046 |
| | | | | 105/215.2 |
| 2,259,533 A | * | 10/1941 | Pfauser | B25B 27/308 |
| | | | | 254/10.5 |
| 7,347,436 B1 | * | 3/2008 | Fawcett | B60G 3/01 |
| | | | | 280/124.127 |
| 2018/0334009 A1 | * | 11/2018 | Smith | B60G 17/023 |

* cited by examiner

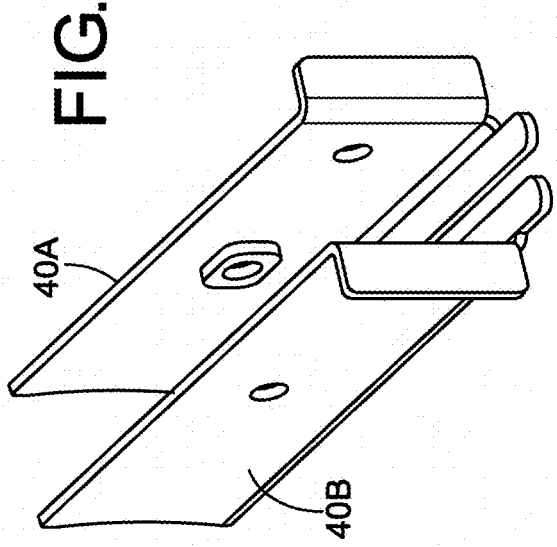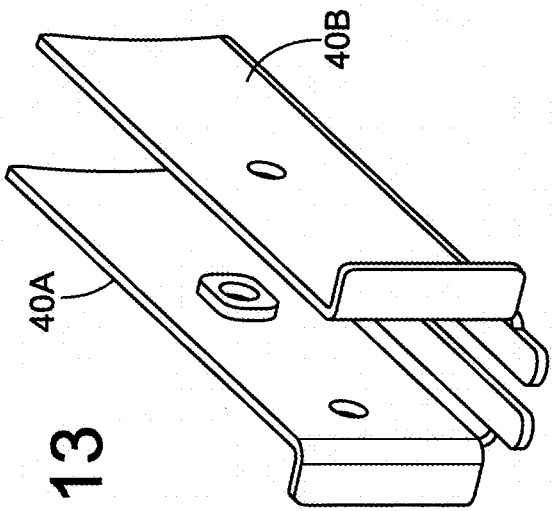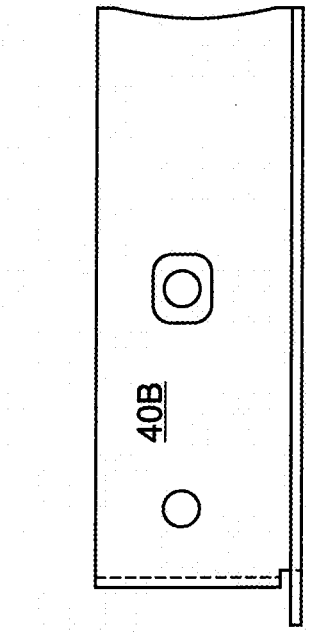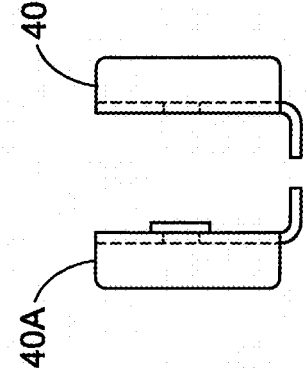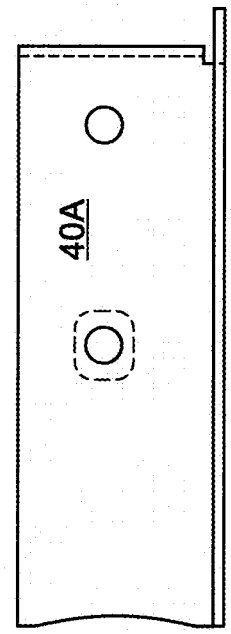

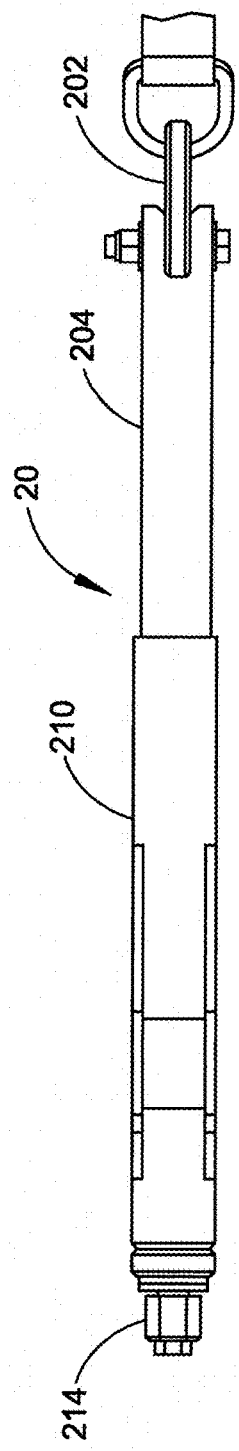
FIG. 19A
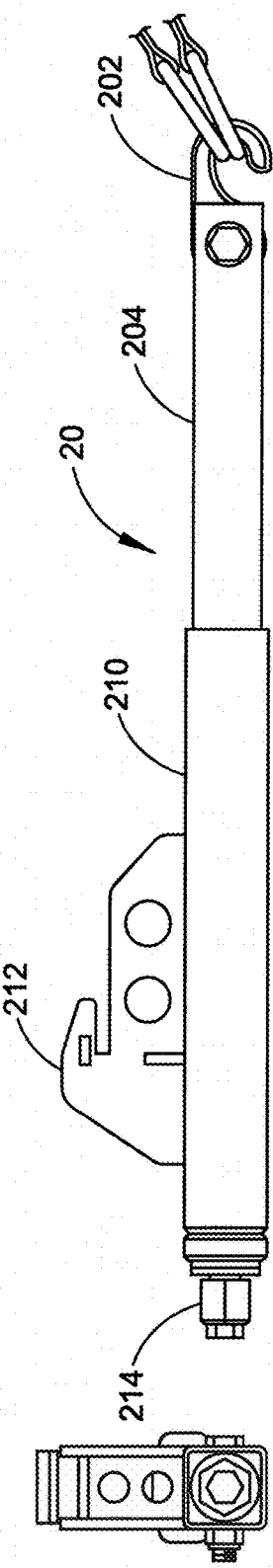
FIG. 19B
FIG. 19C
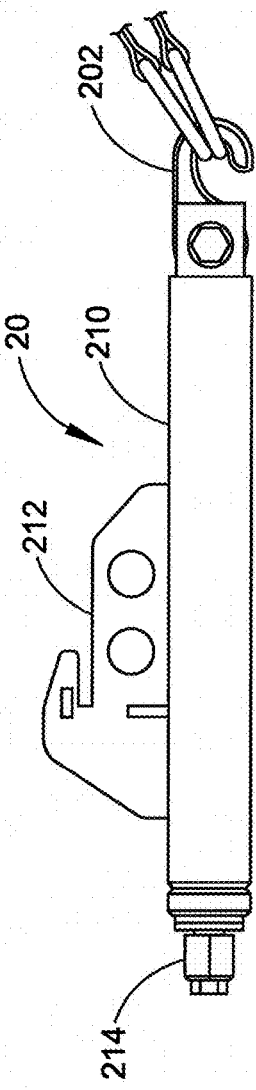
FIG. 19D

SUSPENSION LOWERING SYSTEM FOR VEHICLE TRANSPORT

CROSS-REFERENCE TO RELATED APPLICATIONS

This application claims priority to U.S. Provisional Patent Application Ser. No. 62/340,941, filed May 24, 2016, and titled INTERNAL AIR TRANSPORT SUSPENSION LOWERING SYSTEM, the entire disclosure of which is incorporated by reference herein.

BACKGROUND

Internal transportation of larger commercial vehicles, such as trucks and sport utility vehicles (SUVs), is a complex procedure, particularly as the vehicle itself may employ substantial articulation in suspension systems, enabling traversal of a wide variety of terrains. Common trucks and SUVs used for military purposes are typically too tall at ride height to drive on/off and fit inside various cargo carriers, e.g., the internal cargo compartment of particular military aircraft, shipping containers, flatbed transports (bridge/overpass height limits), and the like. Since the vehicle must be capable of traversing complex and restricted terrain, the vehicle must maintain its current ride height and compressive wheel travel during normal operations.

Current attempts to facilitate the transport of vehicles that do not meet the maximum height limit of the transport medium, e.g., container, aircraft, etc., require substantial modifications. For example, replacement of the rugged and proven live-axles and leaf spring suspensions with hydraulic or air springs are costly and when used on vehicles expected to survive extremely harsh environments or rugged applications, are not truly dependable or subject to easy field repairs. The aforementioned hydraulic method involves costly and complex equipment and frame modifications that could impact durability of the vehicle suspension, and could introduce new potential failure modes. Furthermore, the hydraulic method involves compressing the suspension and requires restraining this stored energy during transport.

Thus, what is needed is a method, system, and assembly that allows for lowering of vehicle ride height to allow transport, without sacrificing durability, ease of use, ease of repair, speed, and vehicle performance.

BRIEF DESCRIPTION

According to one embodiment, there is provided a sliding frame mount assembly, comprising a body; and a shackle, the shackle comprising a top shackle mount pivotally coupling the shackle to the body and a lower shackle mount configured to attach to a leaf spring, wherein the body slideably engages an associated frame of an associated vehicle to raise and lower the associated vehicle via rotation of the shackle.

In accordance with another embodiment, there is provided a system for vehicle height adjustment. The system includes a sliding frame mount assembly, and a screw jack member removably anchored to the associated frame and engaging the top shackle mount via a strap to adjust a position of the sliding frame mount assembly.

In accordance with another embodiment, there is provided a method for internal transportation of a vehicle. The method includes attaching a screw jack member to a frame of the vehicle, and securing a strap around a top shackle mount of a sliding frame mount assembly slideably engaging the frame. The method further includes rotating a threaded component of the screw jack member in a first direction to apply tension to the strap and to relieve tension on at least one fastener securing the sliding frame mount assembly to the frame. The method also includes removing the at least one fastener, and rotating the threaded component of the screw jack member in a second direction opposite the first direction to relieve tension on the strap, wherein the sliding frame mount assembly slides forward on the frame to lower the height of the vehicle.

BRIEF DESCRIPTION OF THE DRAWINGS

FIG. 12 is a schematic view of the frame slide plate members in accordance with one embodiment of the subject application.

FIG. 13 is a schematic view of the frame slide plate members of FIG. 12 from a first perspective in accordance with one embodiment of the subject application.

FIG. 14 is a schematic view of the frame slide plate members of FIG. 12 from a second perspective in accordance with one embodiment of the subject application.

FIG. 19A is a top schematic view of the screw jack member of FIG. 17 in accordance with one embodiment of the subject application.

FIG. 19B is a front schematic view of the screw jack member of FIG. 17 in accordance with one embodiment of the subject application.

FIG. 19C is a side schematic view of the screw jack member of FIG. 17 extended in accordance with one embodiment of the subject application.

FIG. 19D is a side schematic view of the screw jack member of FIG. 17 retracted in accordance with one embodiment of the subject application.

DETAILED DESCRIPTION

Figure 1:
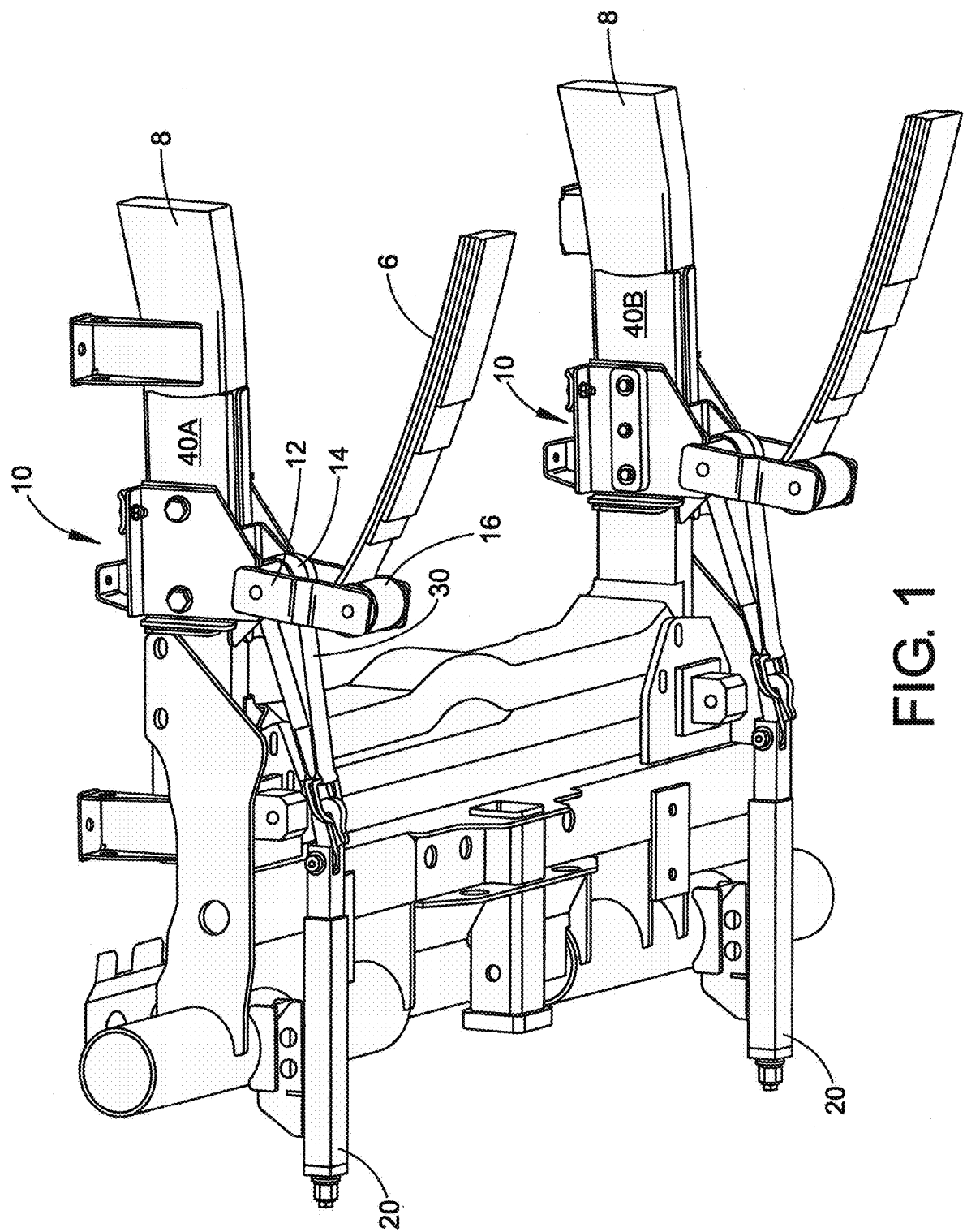
FIG. 1 is a three-dimensional drawing illustrating the frame mount assembly from a bottom view in accordance with one embodiment of the subject application.
Figure 2:
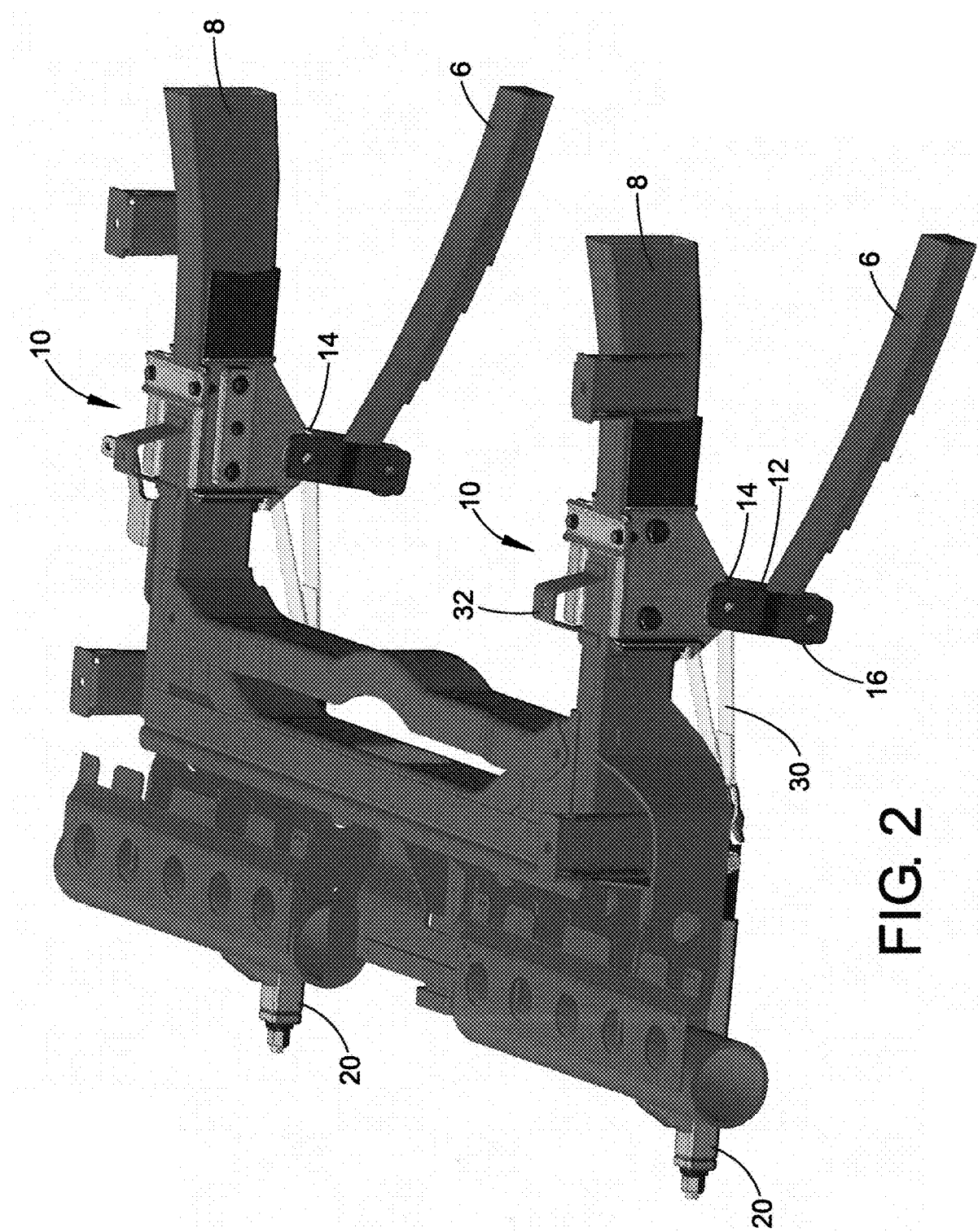
FIG. 2 is a three-dimensional drawing illustrating the frame mount assembly from a top view in accordance with one embodiment of the subject application.
Figure 3:
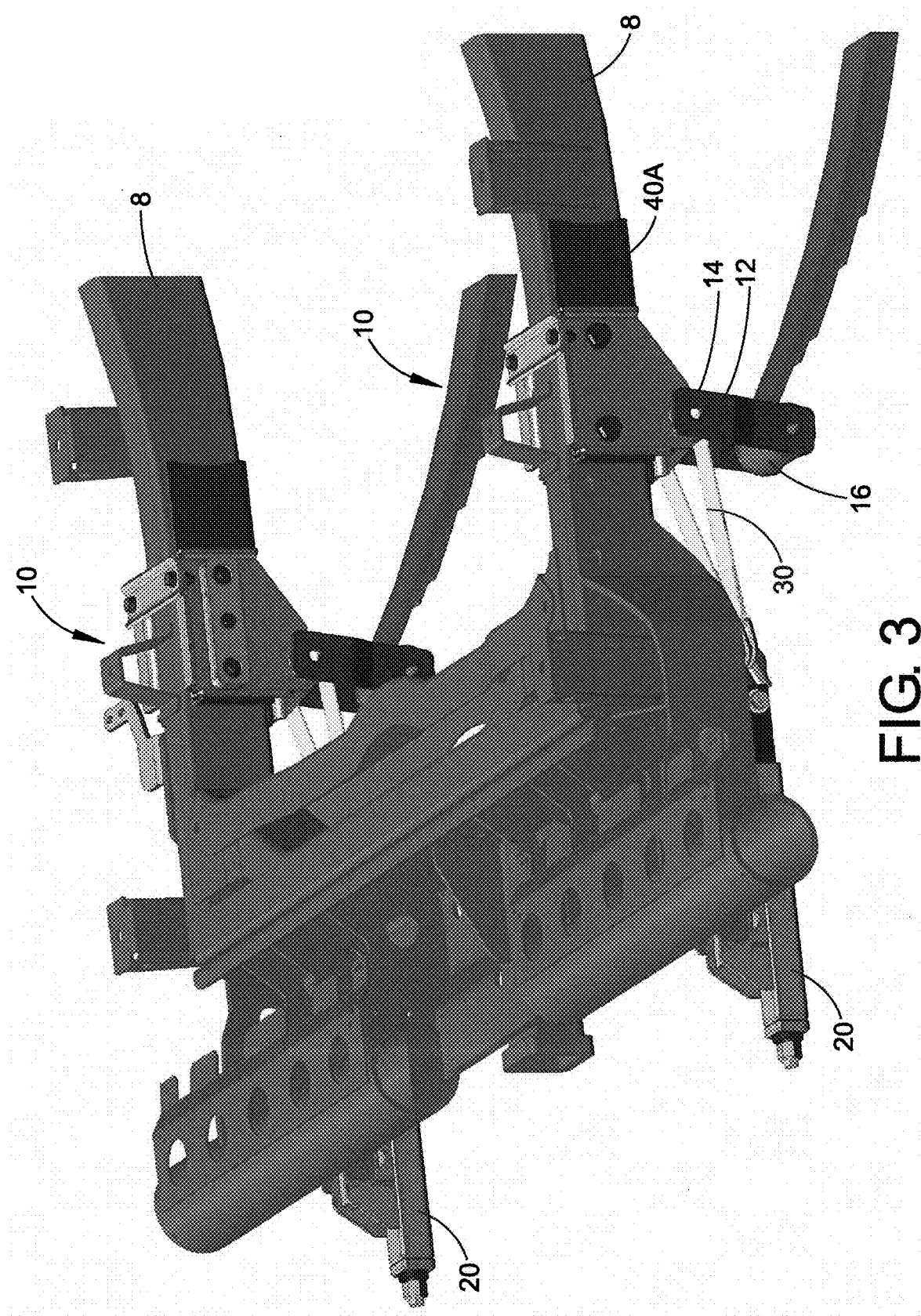
FIG. 3 is a three-dimensional drawing illustrating the frame mount assembly from a first side view in accordance with one embodiment of the subject application.
Figure 4:
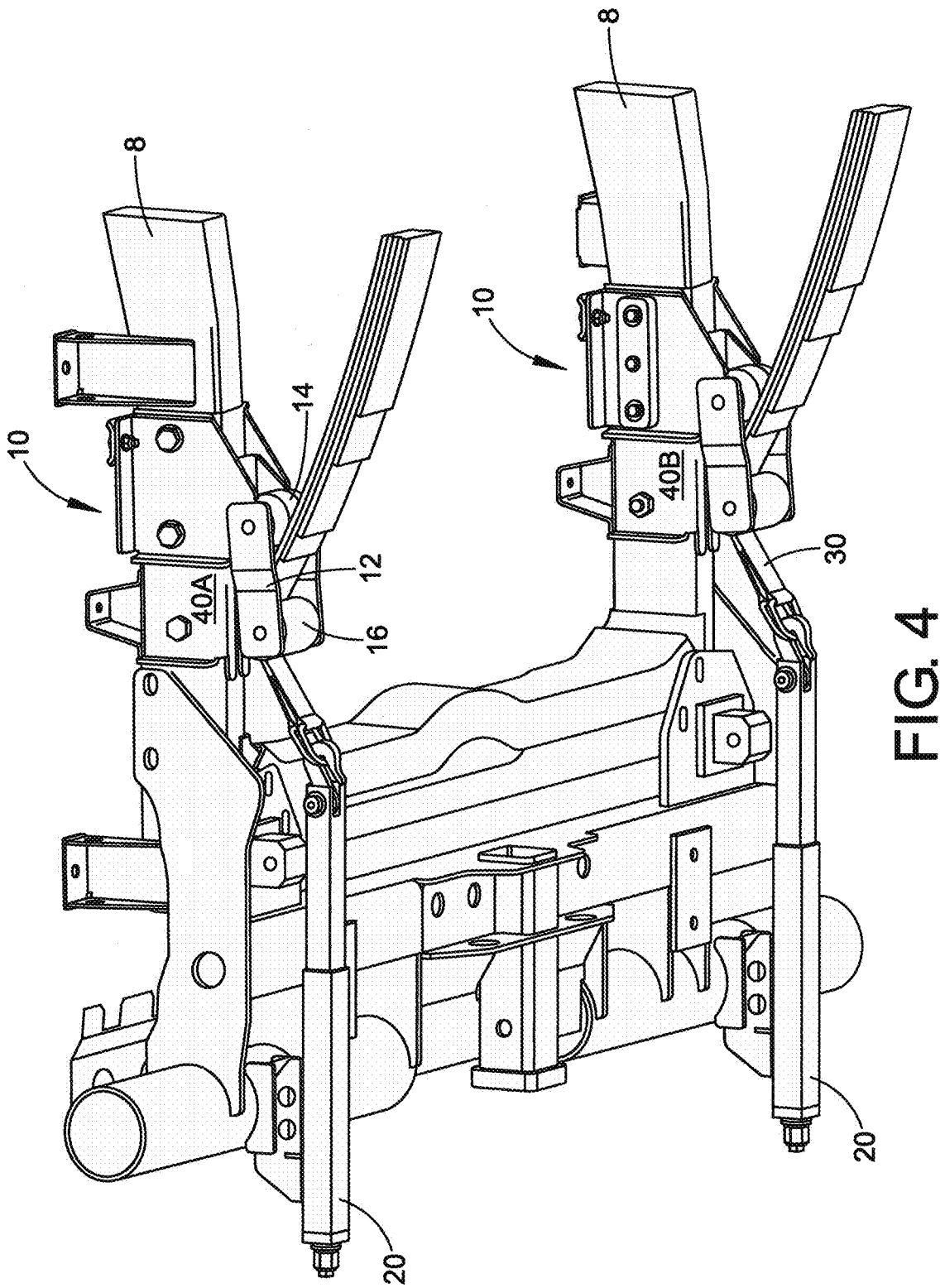
FIG. 4 is a three-dimensional drawing illustrating the frame mount assembly from a second side view in accordance with one embodiment of the subject application.

One or more embodiments will now be described with reference to the attached drawings, wherein like reference numerals are used to refer to like elements throughout. Aspects of exemplary embodiments related to systems and methods for spot color selection are described herein. In addition, example embodiments are presented hereinafter referring to a particular vehicle for purposes of providing an example of the frame mount assembly in accordance with the systems and methods provided herein, and are not intended to limit application of the frame mount assembly solely to that particular vehicle. Accordingly, it will be appreciated that the systems, methods, and assemblies described and illustrated herein are capable of adaptation to myriad other vehicles, e.g., wheeled, tracked, or aircraft undercarriages, etc., i.e., vehicles utilizing rugged suspension systems, as will be appreciated by those skilled in the art.

As briefly discussed above, the frame assembly, system, and method provide for lowering of vehicle ride height to allow transport, without sacrificing durability, ease of use, ease of repair, speed, and vehicle performance. Instead of the compression of the suspension system of a vehicle to lower the height of the vehicle, the embodiments described herein utilize the existing vehicle rear leaf-spring geometry and temporarily relocates (via the frame mount assembly) the rear leaf spring frame mount for transport. As will be appreciated by those skilled in the art, a typical leaf spring is attached to the vehicle frame at the front (rear of vehicle, attachment point located in front of the rear wheel), while the other end is attached to the frame (after the wheel) through a shackle or hanger. The shackle rotates rearward to allow the leaf spring to elongate when compressed, while the vehicle's height lowers. The upper portion of the shackle is typically attached to a fixed point on the frame. In the normal operation at ride height configuration, the shackle is oriented in a near vertical position.

The frame assembly, system, and method provided herein couples the rear leaf spring shackle on each side of the vehicle to respective sliding frame mounts, i.e., the frame mount assembly 10 depicted in the figures described below. The frame mount assembly 10 is removably attached to the frame of the vehicle via two fasteners. To prepare the vehicle for transport, first a screw jack member is anchored to the rear bumper, frame, or other suitable non-moveable attachment point, and a strap is wrapped around the top shackle mount (i.e., the rear spring eye) and back to the screw jack member. Actuation of the screw jack relieves tension on the two fasteners, allowing the fasteners to be removed. Once the fasteners are removed, the screw jack member is actuated in the reverse direction, relieving tension on the strap, allowing the strap to extend and allowing the frame mount assembly to slide forward towards the front of the vehicle. When the frame mount assembly 10 moves to the final forward position, the shackle is rotated to a near horizontal position and the tension loads are removed from the strap. This rotation of the shackle effectively lowers the height of the vehicle. This procedure is performed on both sides of the vehicle and can be performed simultaneously with two operators/users. With the frame mount assembly in its forward position, the screw jack member is removed and the vehicle is ready to drive into the storage container, onto the aircraft, onto a flatbed, or the like.

To return the vehicle to the normal operating ride configuration, the screw jack member is re-anchored to the rear bumper and the strap is reattached. The screw jack member is actuated to pull the frame mount assembly rearward to its original position. The fasteners are re-installed to lock the frame mount assembly into the ride configuration position. The method and mechanisms described herein allows the vehicle to be lowered for transport quickly and efficiently, without the need to restrain relatively high spring and damper forces in compression. Additionally, the systems and methods provided herein does not require the use of a vehicle jack to lift and lower the vehicle, which is time-consuming and potentially challenging endeavor on complex terrain.

Turning now to FIGS. 1-4, there are shown, respectively, a bottom, top, and side three-dimensional illustration of a pair of sliding frame mount assemblies 10 coupled to the frame 8 of a vehicle (not shown) in accordance with one embodiment of the subject application. The frame 8 of the vehicle is adapted via the application of sliding frame members 40A and 40B, permanently affixed to either side of the frame 8, e.g., via welding, or other means. FIGS. 12-16, discussed in greater detail below, provide further illustrations of the configurations of the sliding frame members 40A and 40B as used with the sliding frame mount assembly 10 in accordance with one embodiment of the subject application. In some embodiments, the sliding frame members 40A-40B may be removably attached to the frame 8 via suitable fasteners. As shown in FIGS. 1-4, the sliding frame members 40A and 40B include a bottom portion extending toward the centerline of the bottom of the frame 8. It will be appreciated that while shown in FIGS. 1-4 as being a box-frame, the frame 8 may be implemented in other forms, as used in the vehicle manufacturing industry, whereupon the sliding frame members 40A and 40B are adapted for attachment thereto. Although not shown in FIGS. 1-4, the sliding frame members 40A and 40B include holes extending there through, which holes extend through the frame 8 for transition of a pair of fasteners there through to affix the sliding frame mount assemblies 10 in the ride configuration, as explained in greater detail below.

The sliding frame mount assembly 10 includes an opposing pair of shackles 12 pivotally attached to a top shackle mount 14 of the assembly 10. The shackles 12 include a lower shackle mount 16 to which a leaf spring 6 is coupled. Coupling of the leaf spring 6 to the lower shackle mount 16, as will be appreciated by those skilled in the art, may be undertaken using common attachment means in, for example, the automotive industry. FIGS. 9-16 provide additional detailed views of the sliding frame mount assembly 10, sliding frame members 40A-40B and related components.

Figure 18:
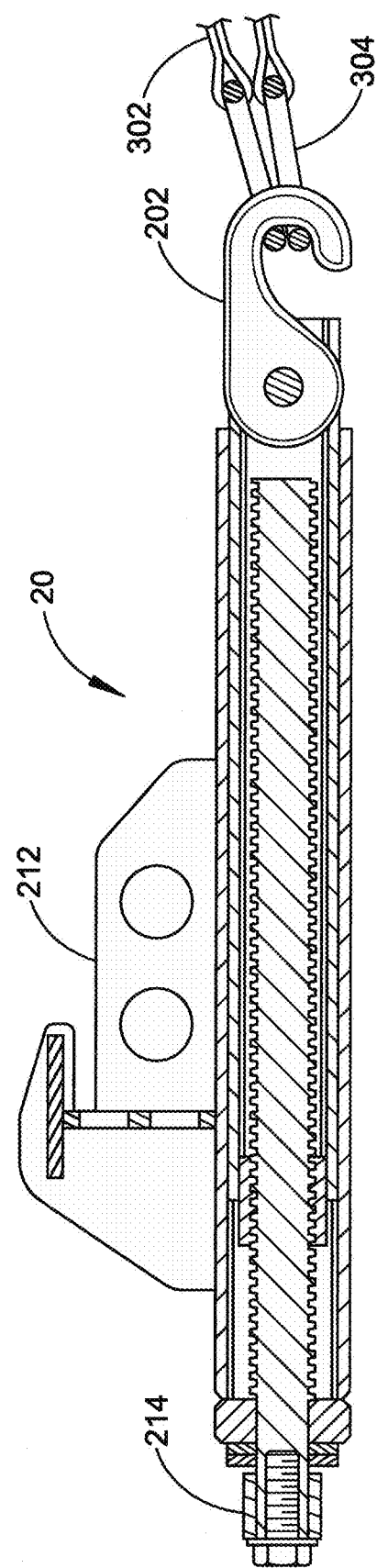
FIG. 18 is a cross-sectional view of the screw jack member of FIG. 17 in accordance with one embodiment of the subject application.

Illustrated in FIGS. 1-4, are a set of screw jack members 20, removably coupled to the frame 8 and configured to interact with the sliding frame mount assemblies 10, as discussed above. A detailed illustration of a screw jack member 20 is provided in FIGS. 18-19D, discussed below. Also shown in FIGS. 1-4, are corresponding straps 30 in communication with the top shackle mount 14 and removably attached to a distal end of the screw jack member 20, i.e., an end opposite the end anchored to the frame 8. Expanded views of the straps 30 utilized in one embodiment of the subject application are included in FIGS. 20-22.

Figure 5:
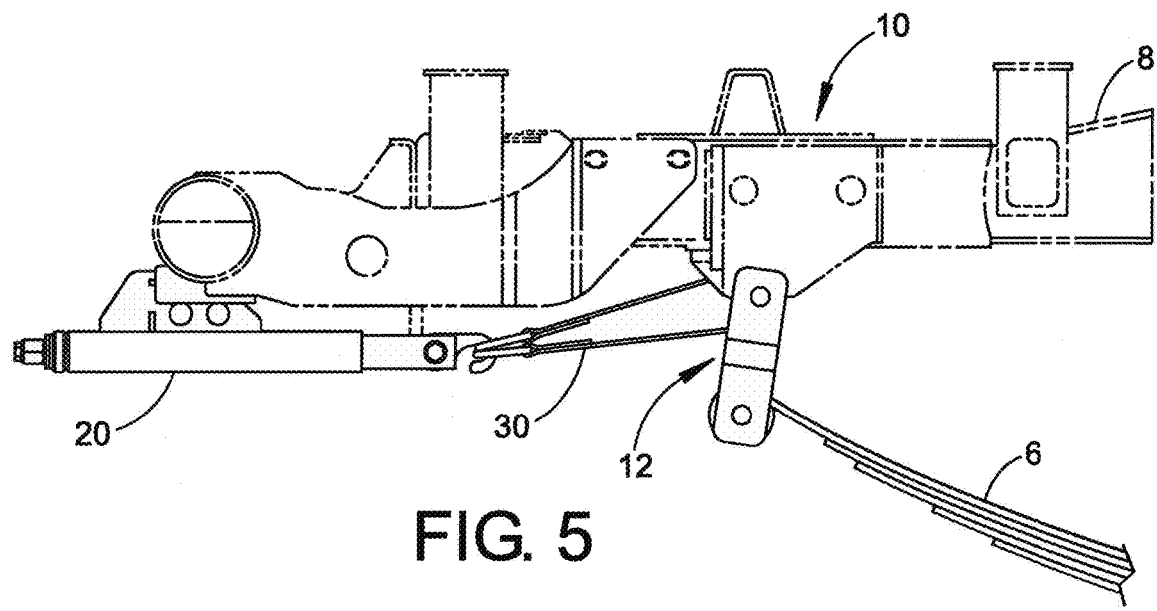
FIG. 5 is a schematic illustration of the frame mount assembly in a ride configuration in accordance with one embodiment of the subject application.
Figure 6:
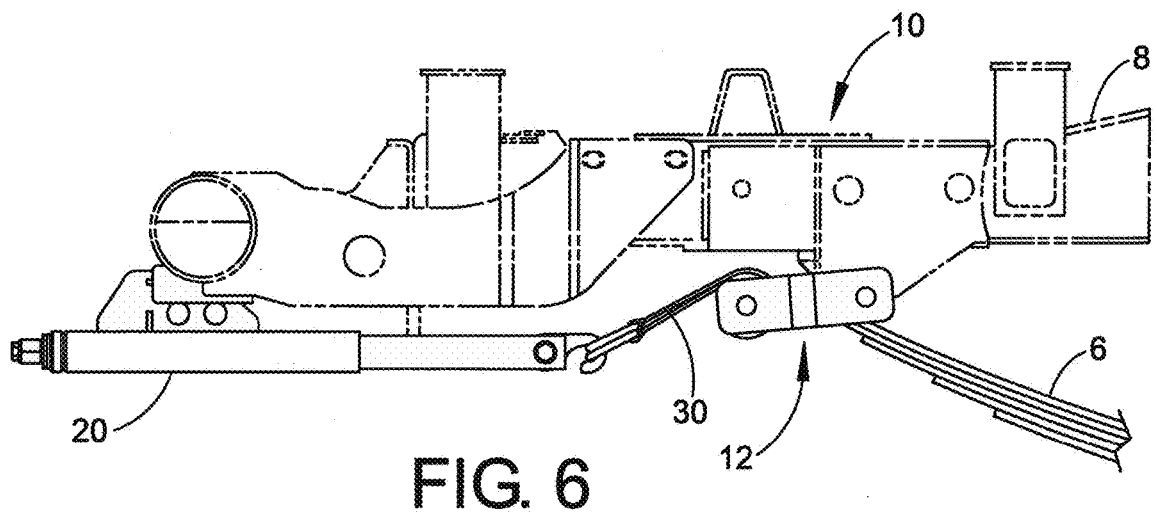
FIG. 6 is a schematic illustration of the frame mount assembly in a transport configuration in accordance with one embodiment of the subject application.
Figure 7:
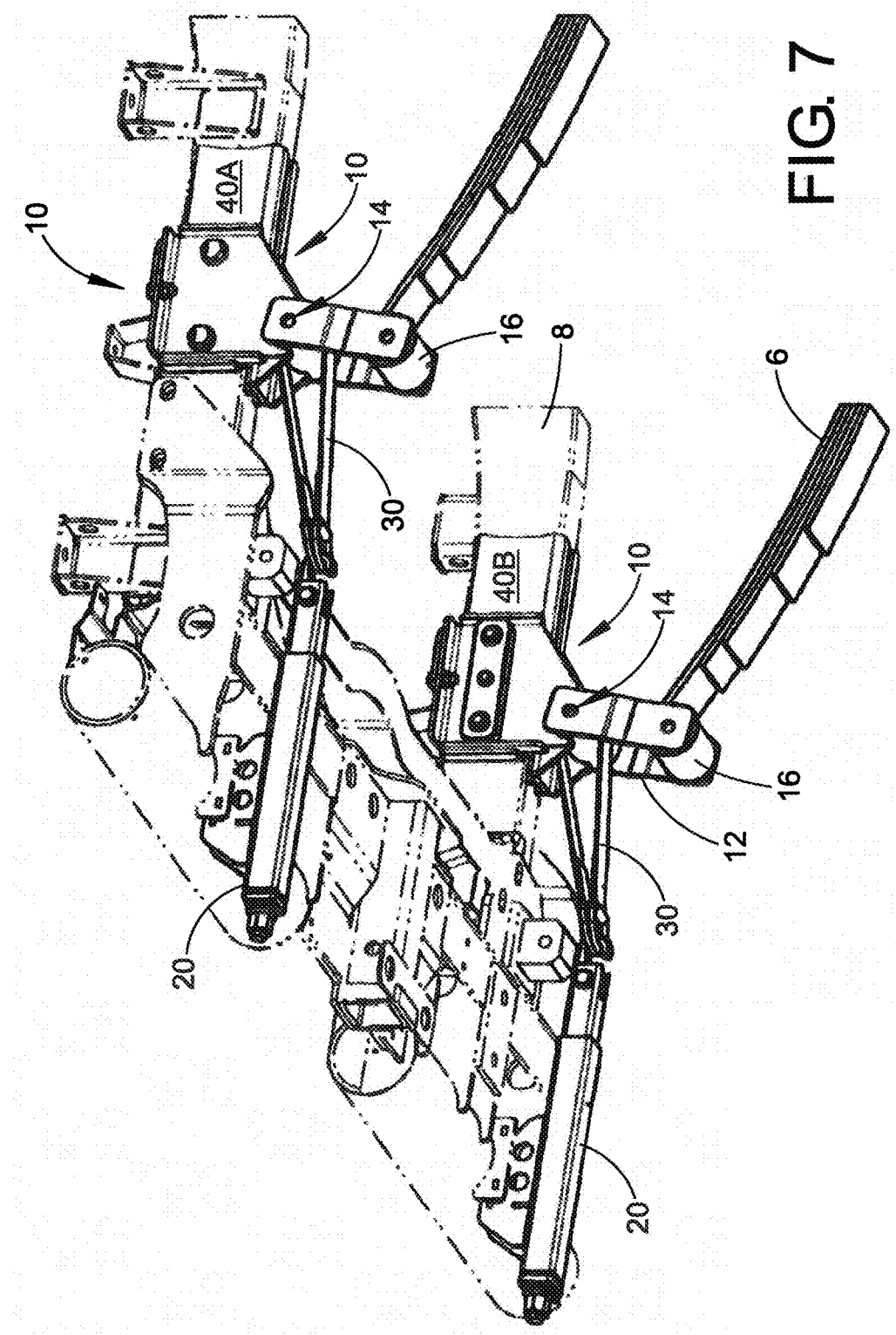
FIG. 7 is a schematic illustration of the frame mount assembly in a ride configuration as viewed from underneath a vehicle in accordance with one embodiment of the subject application.
Figure 8:
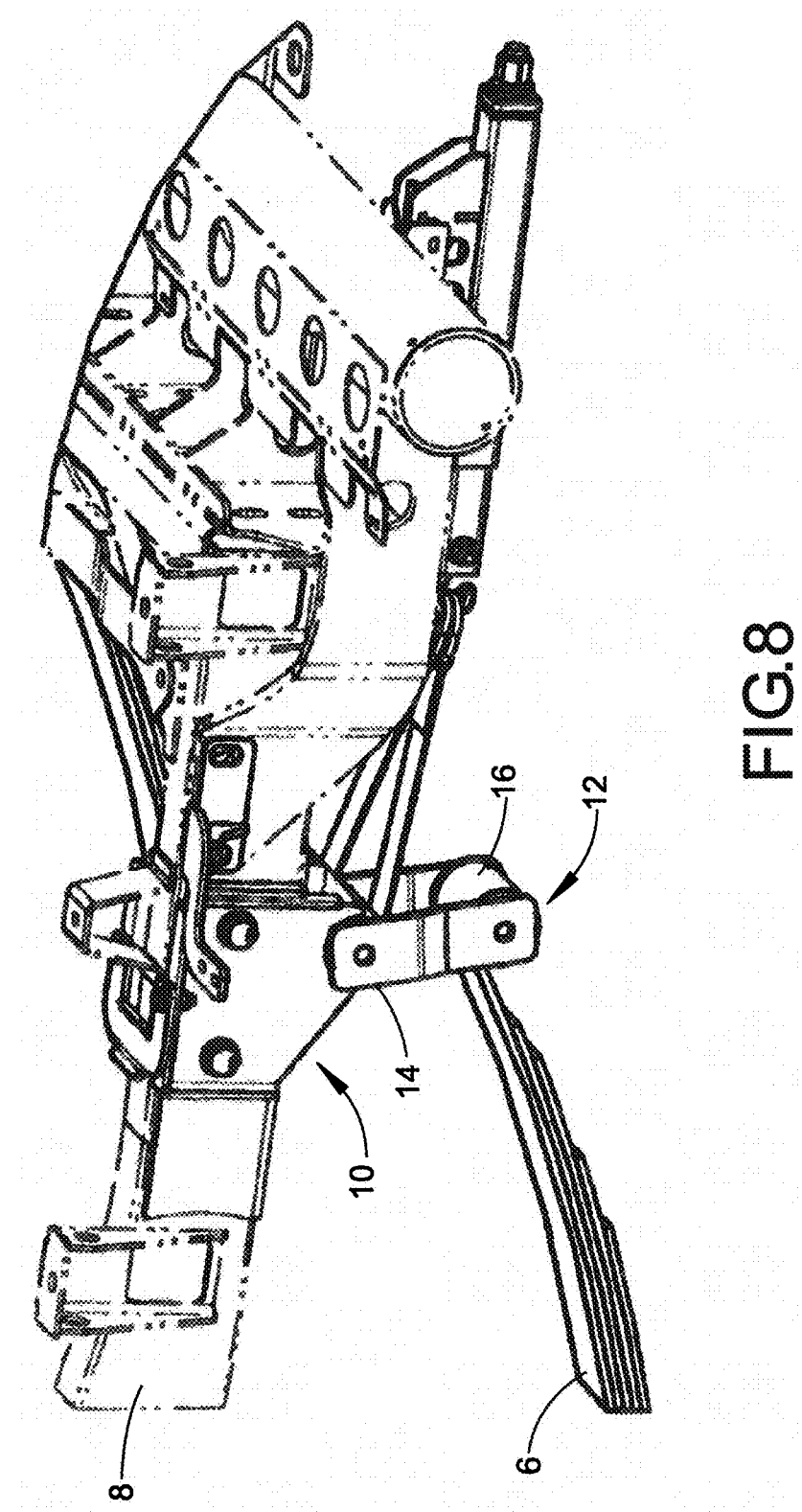
FIG. 8 is a schematic illustration of the frame mount assembly coupled to the frame of a vehicle with screw jack in the ride configuration according to one embodiment of the subject application.

Turning now to FIGS. 5-8, there are shown a plurality of views of the sliding frame mount assembly 10 coupled to the frame 8 of an associated vehicle. The views shown in FIGS. 5-8 provide additional details as to one implementation of the sliding frame mount assembly 10 in accordance with one embodiment of the subject application. In particular, FIG. 5 provides a side view of the sliding frame mount assembly 10 in the ride configuration. That is, as shown in FIG. 5, the shackle 14 extends downward from the frame 8, wherein the sliding frame mount assembly 10 is affixed to the frame 8 via fasteners 112. With the fasteners 112 removed, as shown in FIG. 6, the sliding frame mount assembly 10 slides toward the front of the vehicle (not shown) along the sliding frame members 40A-40B on the frame 8, thereby causing the leaf spring 6 to rotate the shackle upwards and to the rear of the vehicle about the top shackle mount 14. That is, when in the ride configuration, as shown in FIG. 5, the shackle 12 extends perpendicularly downward relative to the frame 8 and in the transport configuration, as shown in FIG. 6, the shackle 12 rotates/pivots to the rear of the vehicle, now in parallel to the frame 8.

Figure 9:
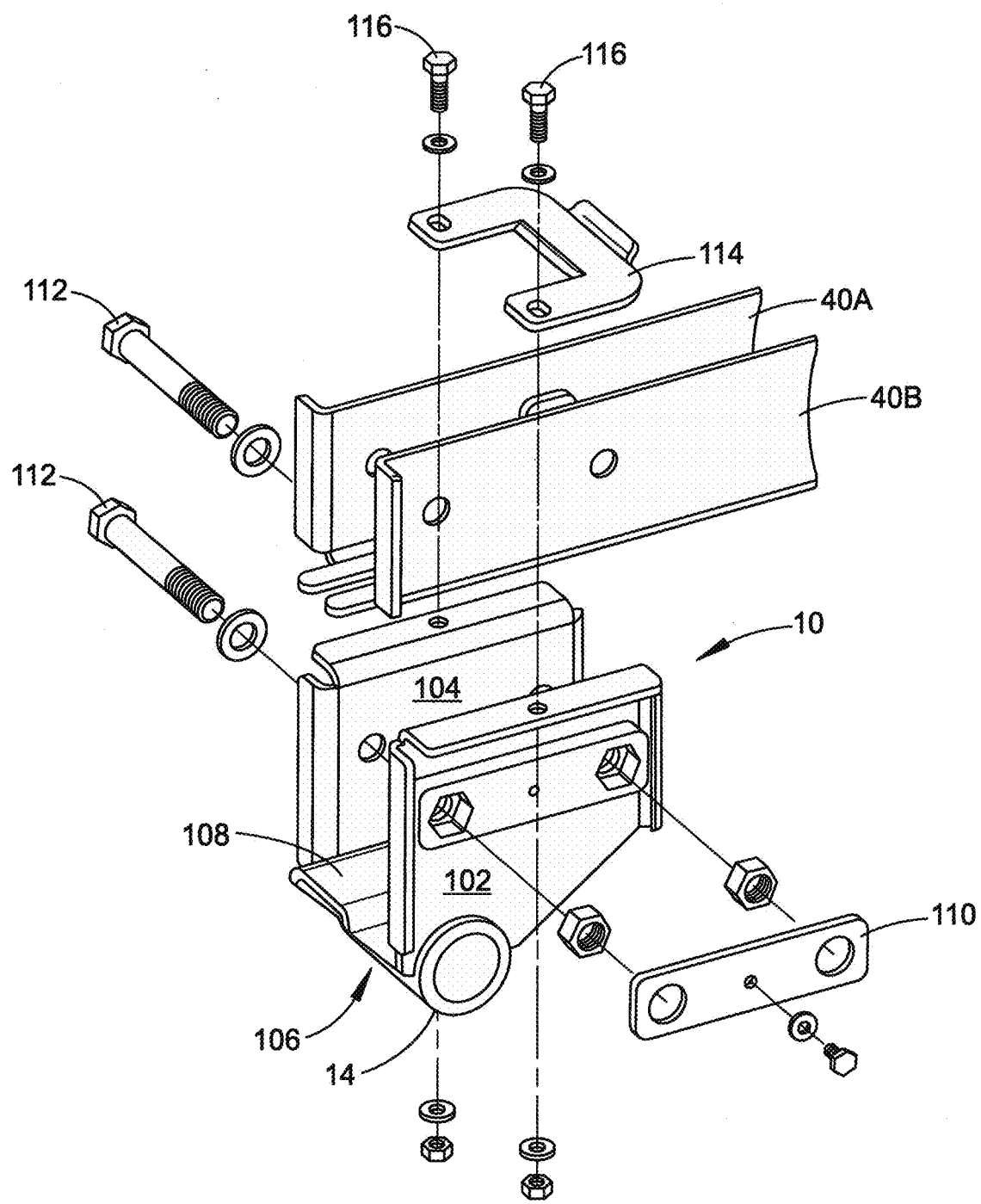
FIG. 9 is an exploded view of the components of the frame mount assembly in accordance with one embodiment of the subject application.

Referring now to FIGS. 9-16, there are shown varying views of the sliding frame mount assembly 10 in accordance with one embodiment of the subject application. With respect to FIG. 9, there is shown an exploded view of the sliding frame mount assembly 10, including the sliding frame members 40A and 40B. As shown in FIG. 9, the assembly 10 includes an inner side portion 102 (facing toward the centerline of the vehicle) and an outer side portion 104, the side portions 102 and 104 separated by a bottom portion 106. The bottom portion 106 includes the top shackle mount 14 to which the shackle 12 is attached (see, e.g., FIGS. 1-8). The bottom portion 106, in some embodiments, is configured to contact the underside of the frame 8, as shown in FIGS. 1-8. The side portions 102 and 104, as well as the sliding frame members 40A and 40B include holes aligning with corresponding holes (not shown) on the frame 8, allowing fasteners 112 to transition there through, removably attaching the sliding frame mount assembly 10 to the frame 8.

Figure 11:
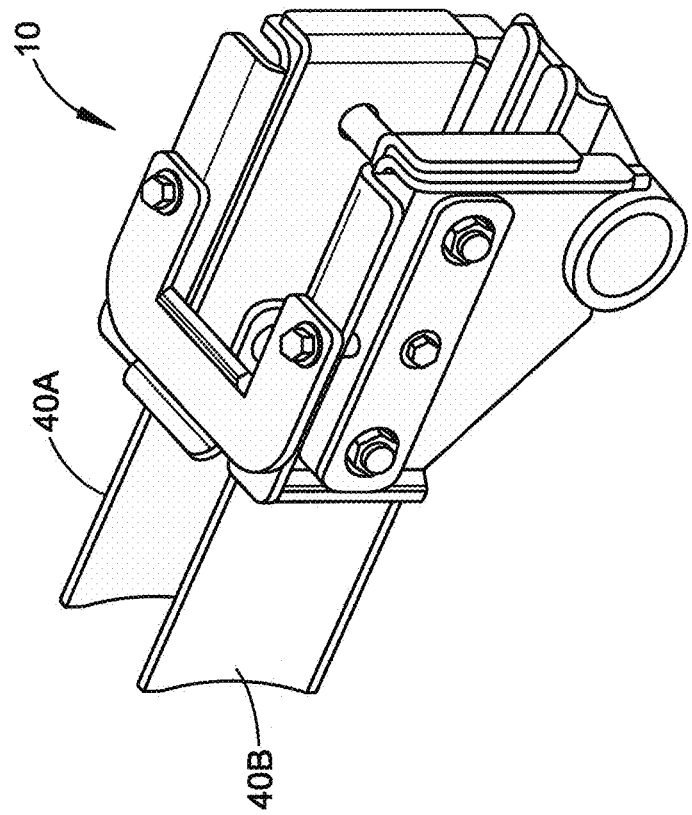
FIG. 11 is a second side view of the frame mount assembly in accordance with one embodiment of the subject application.
Figure 10:
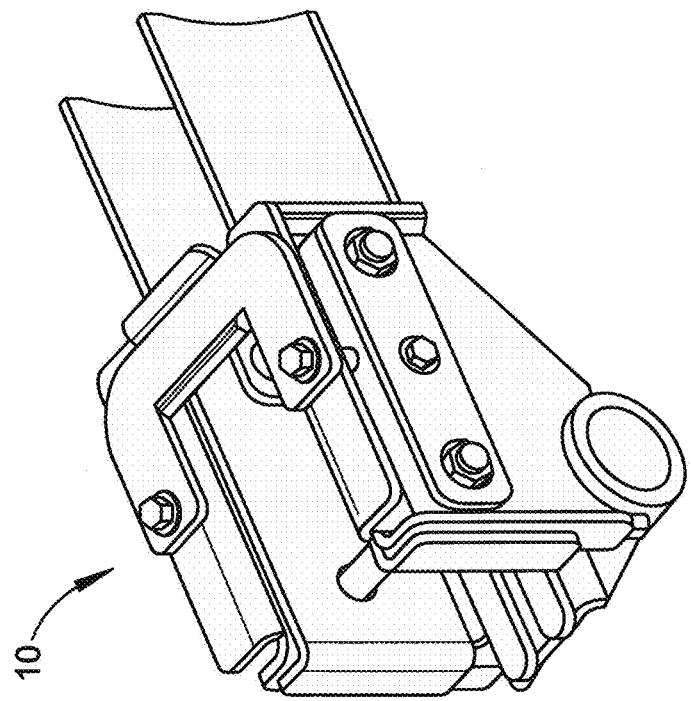
FIG. 10 is a first side view of the frame mount assembly in accordance with one embodiment of the subject application.

The sliding frame mount assembly 10 depicted in FIG. 9 further includes a top brace 114, located above the top of the frame 8 and connecting the top of the side portions 102 and 104. As shown in FIG. 9, the side portions 102 and 104 each include tabs extending perpendicularly outward from the outside faces of the portions 102 and 104. Fasteners 116 are configured to secure the sliding frame mount assembly 10, so as to prevent the assembly 10 from displacing perpendicularly from the frame 8 after the fasteners 112 are removed for transitioning from ride configuration to transport configuration. As shown in FIG. 9, the top brace 114 is configured to slide along the top of the frame 8, as well as to function as a stop against a body mount (shown at 32 in FIG. 2). The top brace 114 is secured to the side portions 102 and 104 via fasteners 116 inserted through the top brace 114 into respective holes in the tabs of the portions 102-104, as illustrated in FIG. 9. The sliding frame mount assembly 10 further includes an external stop 110 positioned on the inner side 102 of the assembly 10, collaborating with nuts 111 to retain the fasteners 112 when the assembly 10 is mounted to the frame 8 of the vehicle. FIGS. 10 and 11 provide top assembled illustrations of the sliding frame mount assembly 10 depicted in FIG. 9.

Figure 15:
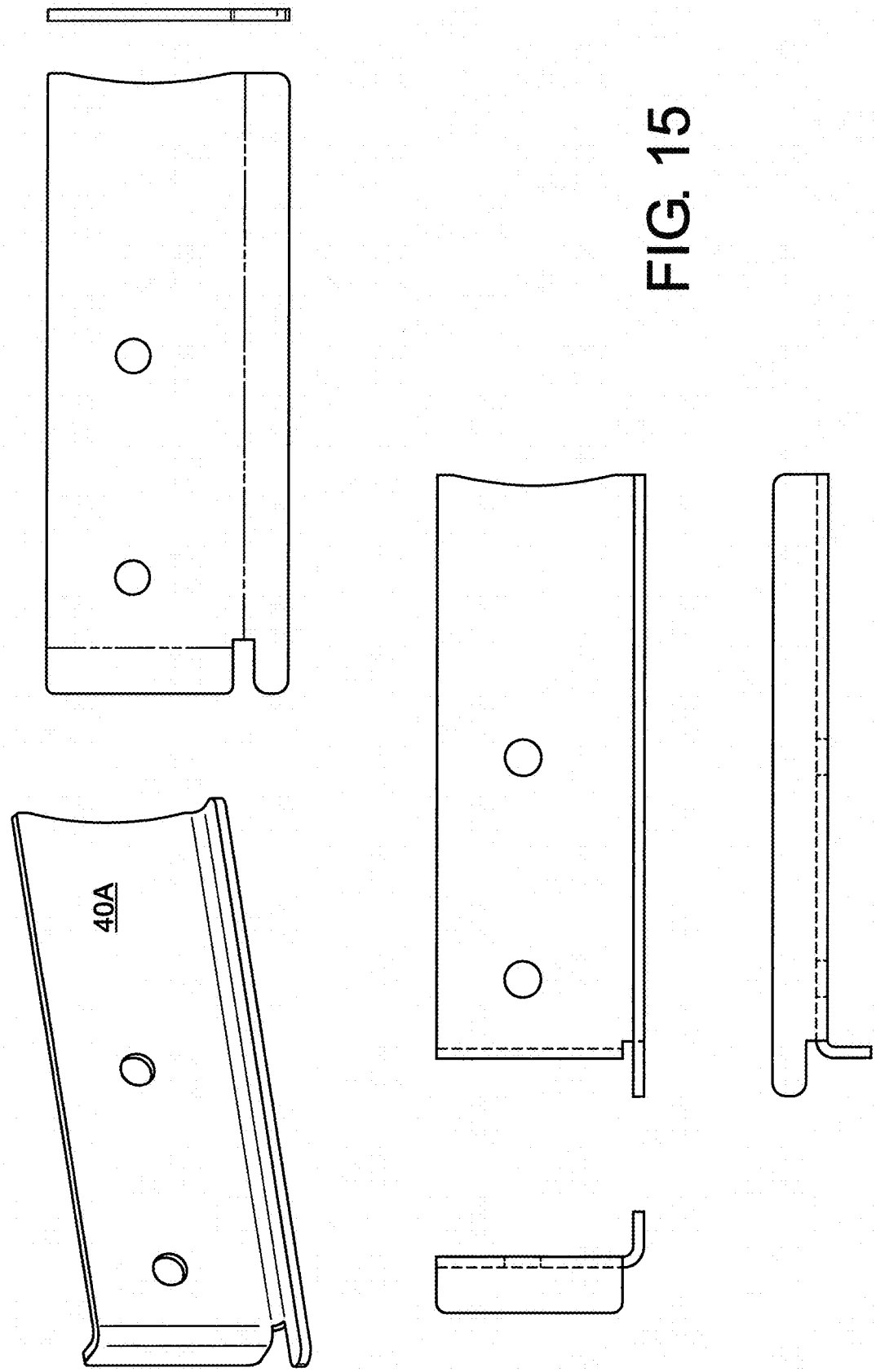
FIG. 15 is a set of schematic views of a first frame slide plate member of FIG. 12 in accordance with one embodiment of the subject application.
Figure 16:
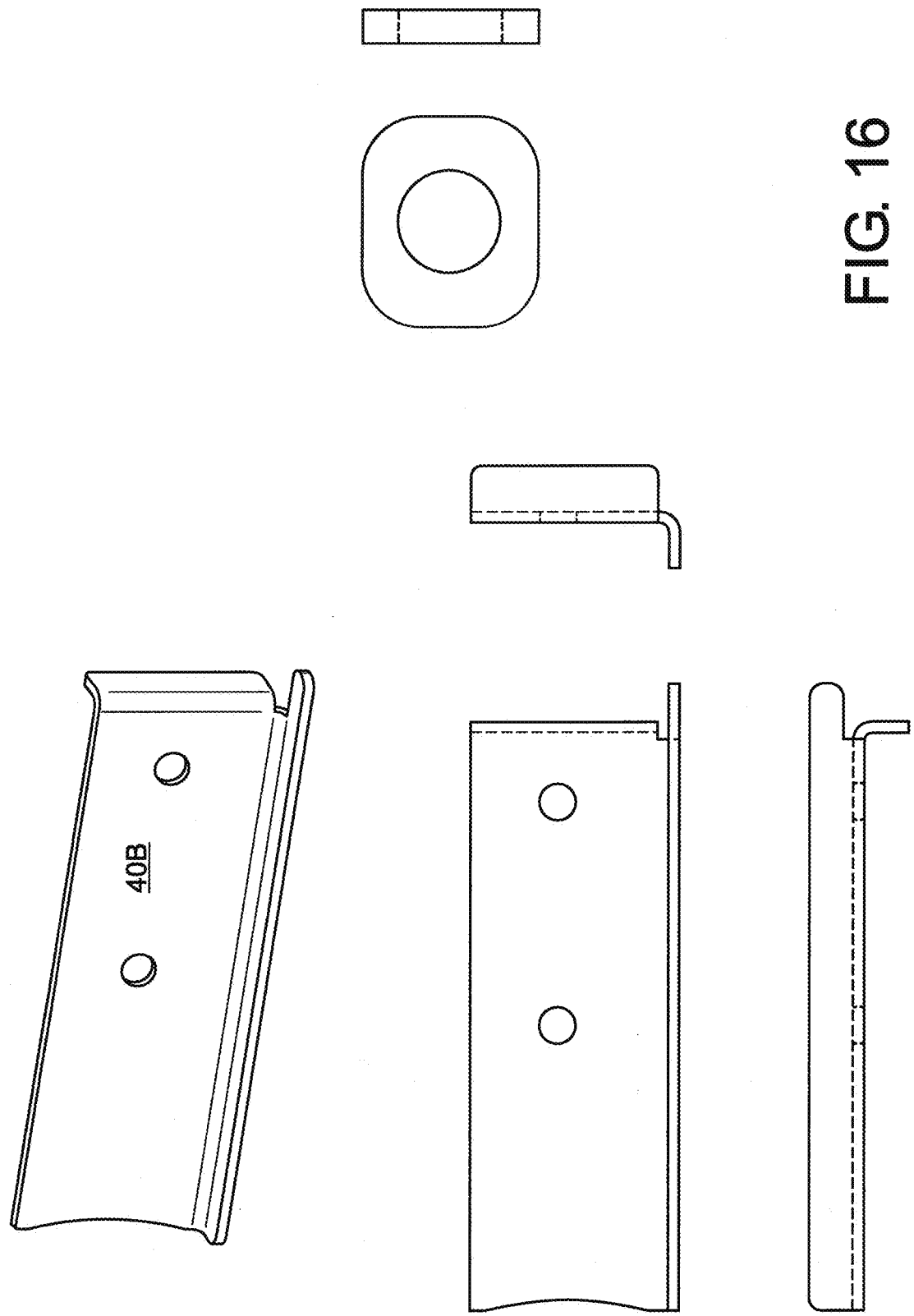
FIG. 16 is a set of schematic views of a second frame slide plate member of FIG. 12 in accordance with one embodiment of the subject application.
Figure 17:
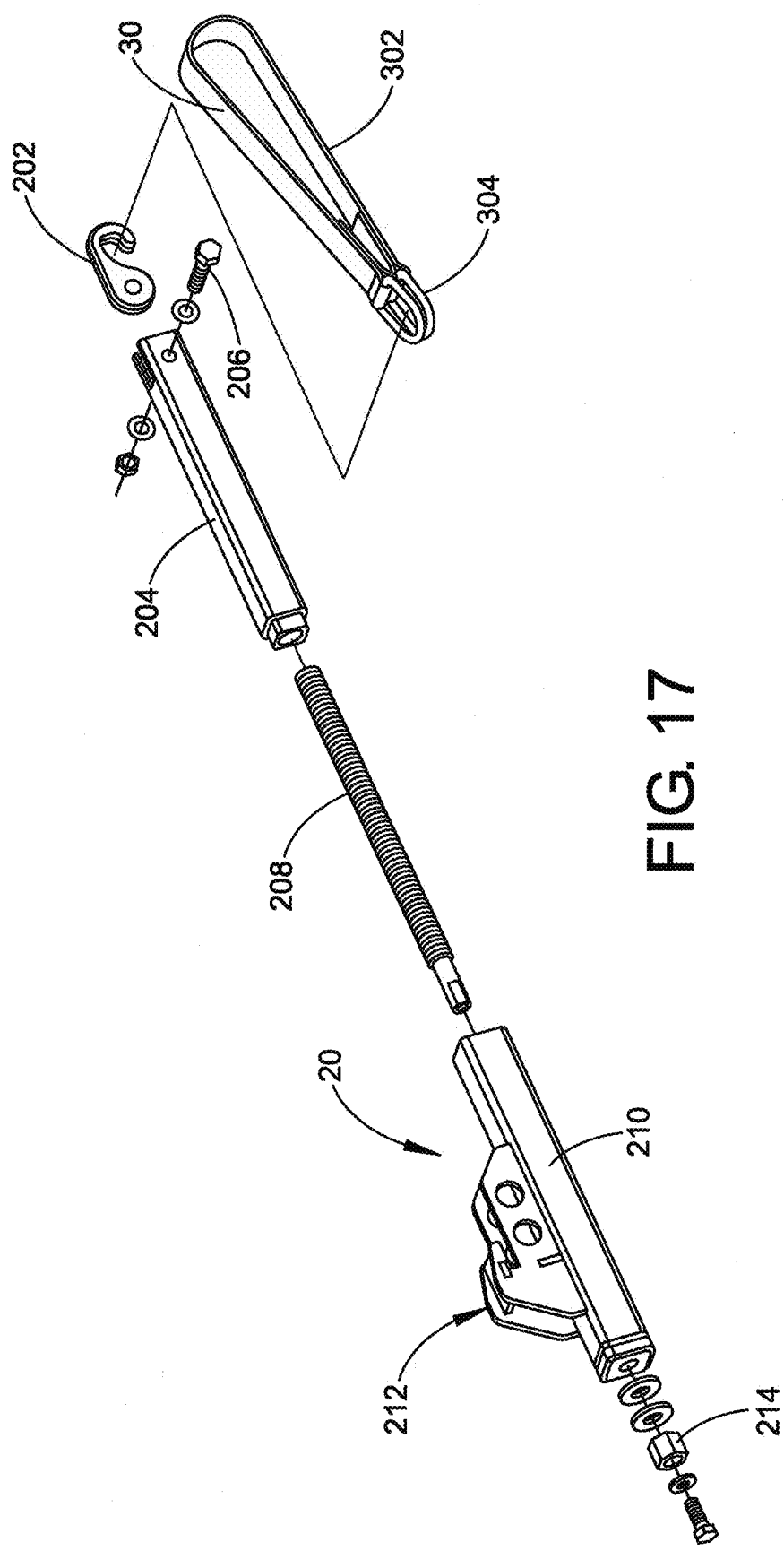
FIG. 17 is an exploded view of a screw jack member used by the frame mount assembly in accordance with one embodiment of the subject application.

Referring now to FIGS. 12-16, there are shown various views of the sliding frame members 40A and 40B that are coupled to the frame 8 and along which the sliding frame mount assembly 10 slides to raise and lower the height of the vehicle. In particular FIG. 12, provides a side view of the members 40A-40B, with sliding frame member 40A prominent, followed by a head on view of both members and a side view of the outside of sliding frame member 40B. FIGS. 13 and 14 provide illustrations of the sliding frame members 40A and 40B, with member 40A to be placed on the outer side of the frame 8 facing away from the centerline of the vehicle, and member 40B positioned on the inner side of the frame 8 facing the centerline of the vehicle. FIG. 15 provides a detailed and expanded view of the sliding frame member 40A unattached to the vehicle frame 8. FIG. 16 provides a detailed and expanded view of the sliding frame member 40B unattached to the vehicle frame 8.

As briefly discussed above, various means are contemplated for relieving tension on the shackle 12, and the sliding frame mount 10 in accordance with embodiments of the subject application. Operations of the system for lowering the height of an associated vehicle using the sliding frame mount assembly 10 depicted in FIGS. 1-16 will be better understood in conjunction with the screw jack member 20 shown in FIGS. 17-19D. In particular, a strap 30 communicating with the top shackle mount 14 of the shackle 12 is attached to a hook 202 coupled to the extension shaft 204 of the screw jack member 20 via fastener 206. The extension shaft 204 is configured to retract into a base member 210 and extend outward from an opening of the base member 210. A threaded member 208 is coupled to the extension shaft 204 and is coupled to a nut 214 at a distal end of the base member 210, the distal end of the base member 210 located opposite the opening from which the extension shaft 204 extends and retracts. Rotation of the nut 214, which is coupled to the threaded member 208 in one direction causes the extension shaft 204 to extend outwards in a direction away from the nut 214. Similarly, rotating the nut 214 in an opposite direction causes the extension shaft 204 to retract within the base member 210. In some embodiments, the nut 214 is sized to correspond to the size of the lug nuts (not shown) employed to retain the wheels on the vehicle, thereby ensuring that appropriate tools are present, e.g., lug wrench, may be used to raise and lower the vehicle.

Figure 20:
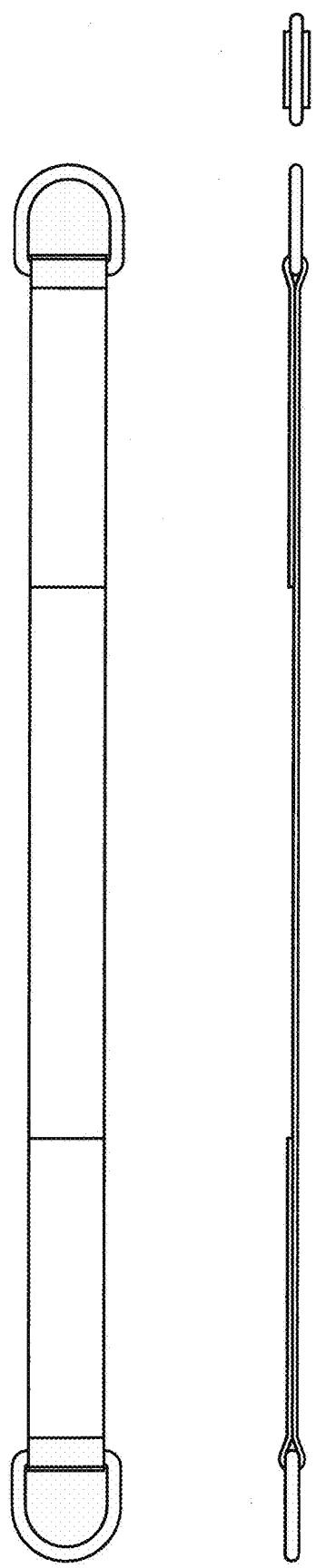
FIG. 20 is a schematic illustration of the strap used by the frame mount assembly in accordance with one embodiment of the subject application.
Figure 21:
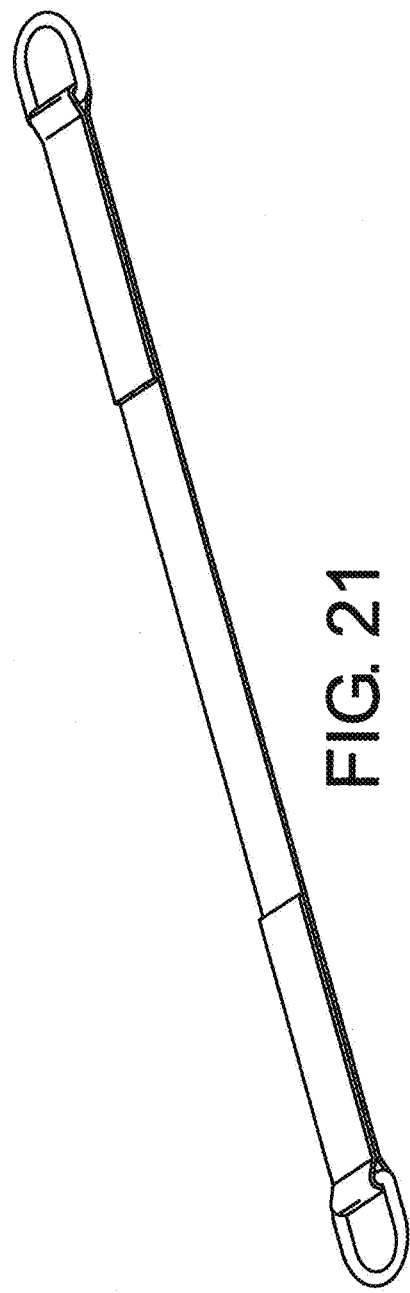
FIG. 21 is another schematic illustration of the strap used by the frame mount assembly of FIG. 20 in accordance with one embodiment of the subject application.
Figure 22:
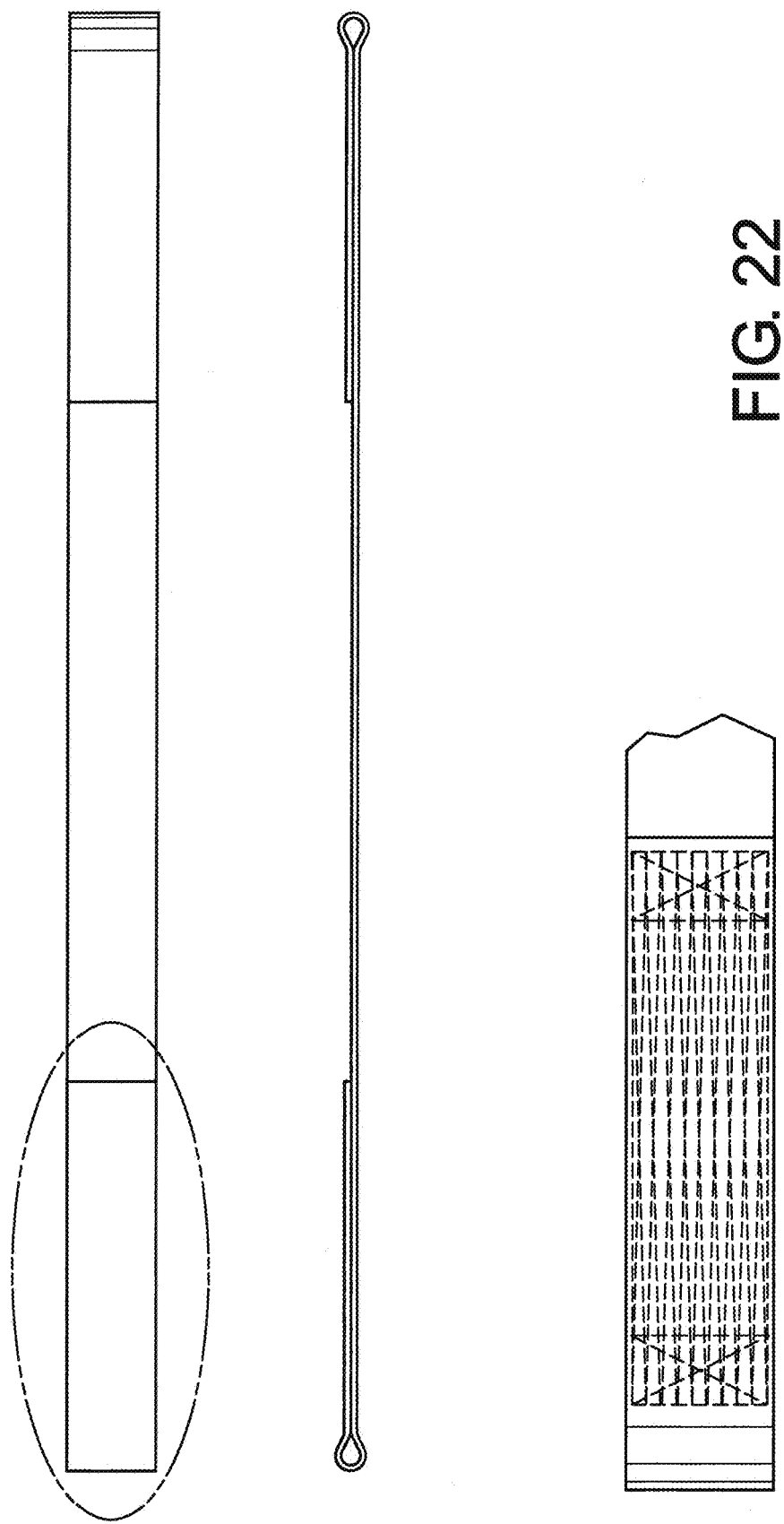
FIG. 22 is another schematic illustration of the strap used by the frame mount assembly of FIGS. 20 and 21 in accordance with one embodiment of the subject application.

Located on a top of the based member 210 is an anchor component 212 configured to securely attach the screw jack member 20 to the frame 8 or other anchoring point on the vehicle. The strap 30 utilized in raising and lowering the vehicle height is illustrated in FIGS. 20-22, and comprises a strap portion 302 of a suitable material, e.g., nylon, or other suitable artificial or natural material capable of flexing and meeting load requirements associated with movement of the sliding frame mount assembly 10, as will be appreciated by those skilled in the art. Attached at opposite ends of the strap portion 302 are connectors 304, looped or other suitable connectors, capable of being removably coupled to the hook 202 of the jack screw member 20.

Figure 23:
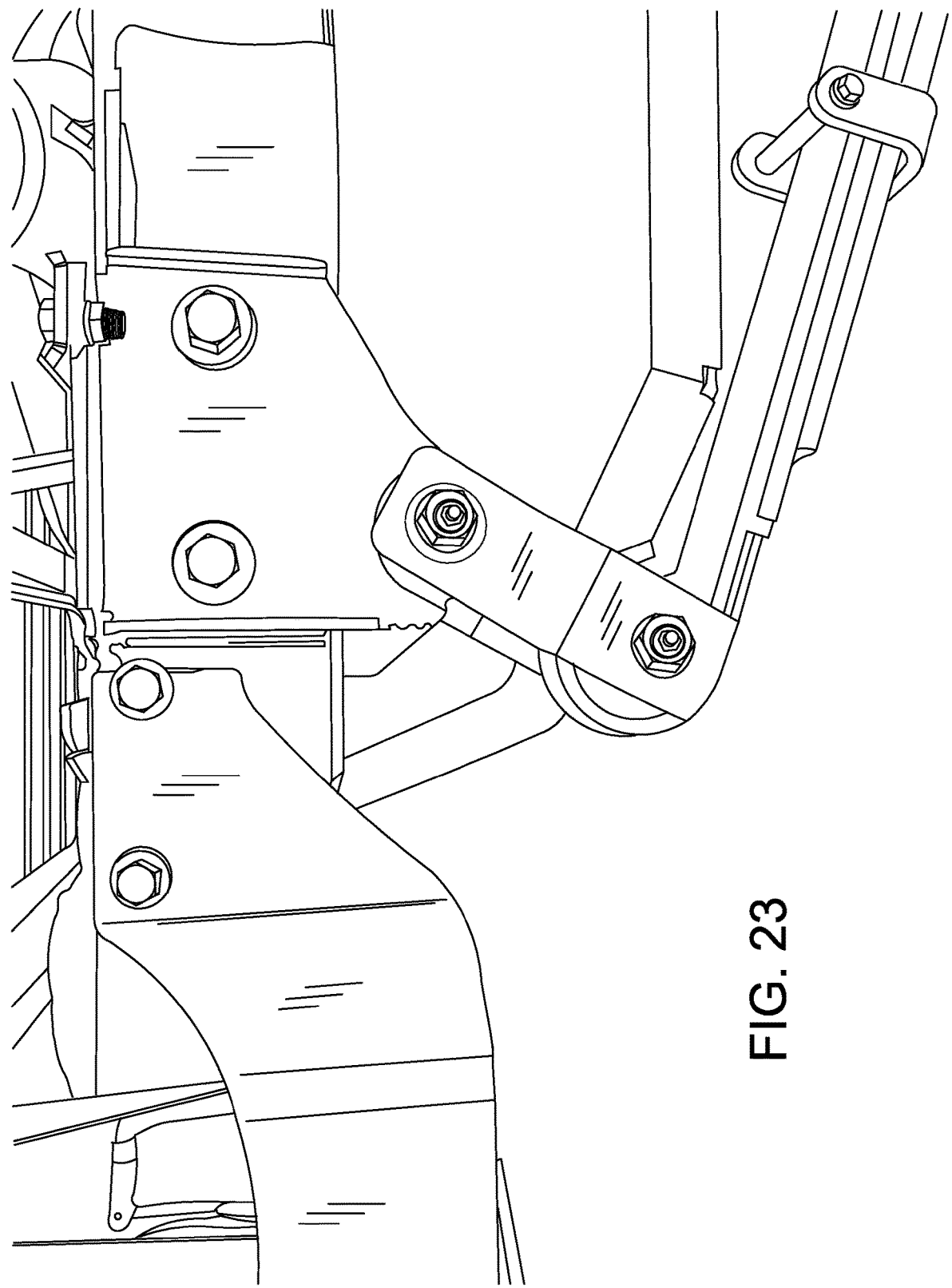
FIG. 23 is a photograph illustrating the frame mount assembly in ride configuration coupled to the frame of a vehicle in accordance with one embodiment of the subject application.
Figure 24:
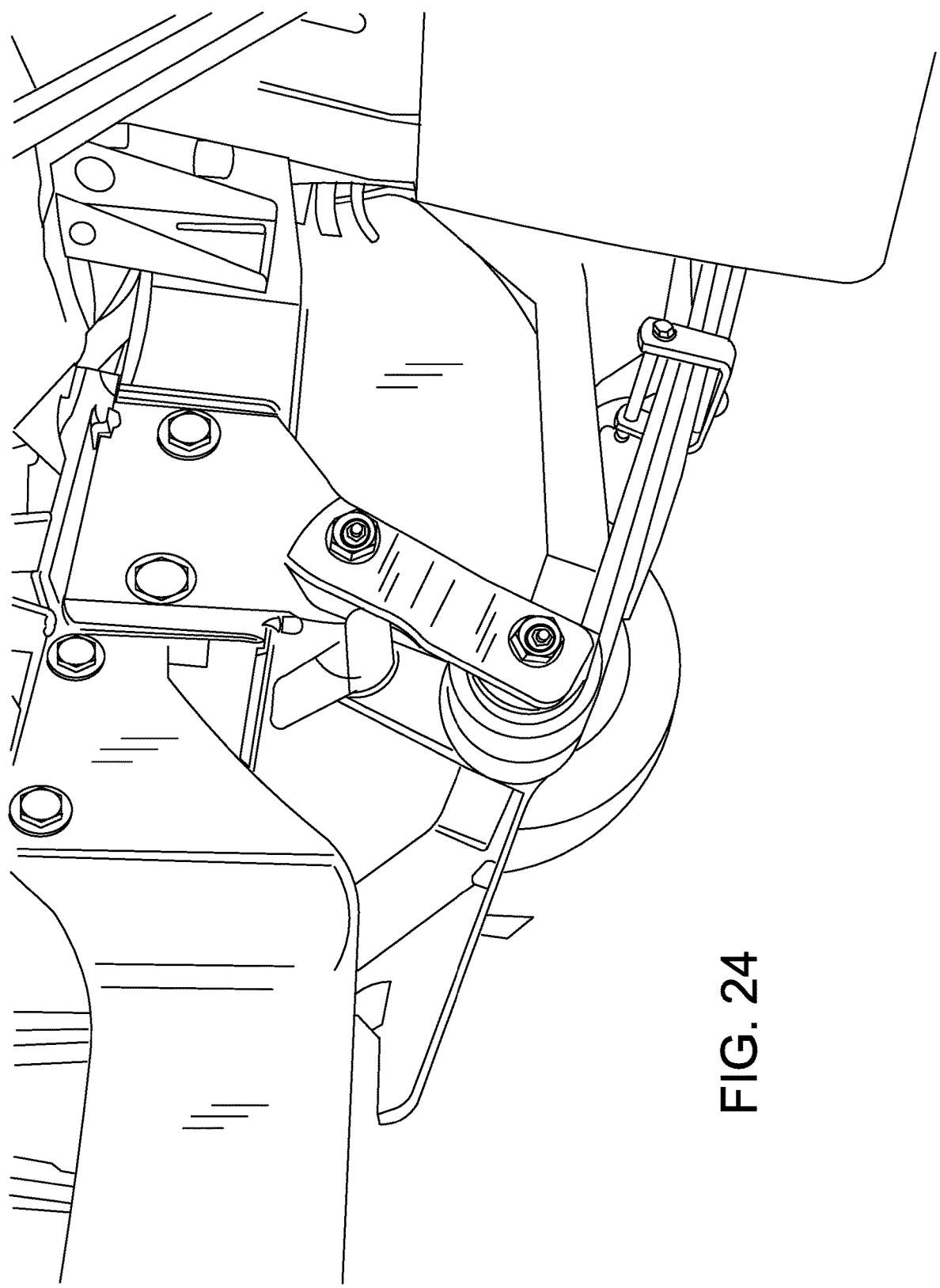
FIG. 24 is a second photograph illustrating the frame mount assembly in ride configuration coupled to the frame of a vehicle in accordance with one embodiment of the subject application.
Figure 25:
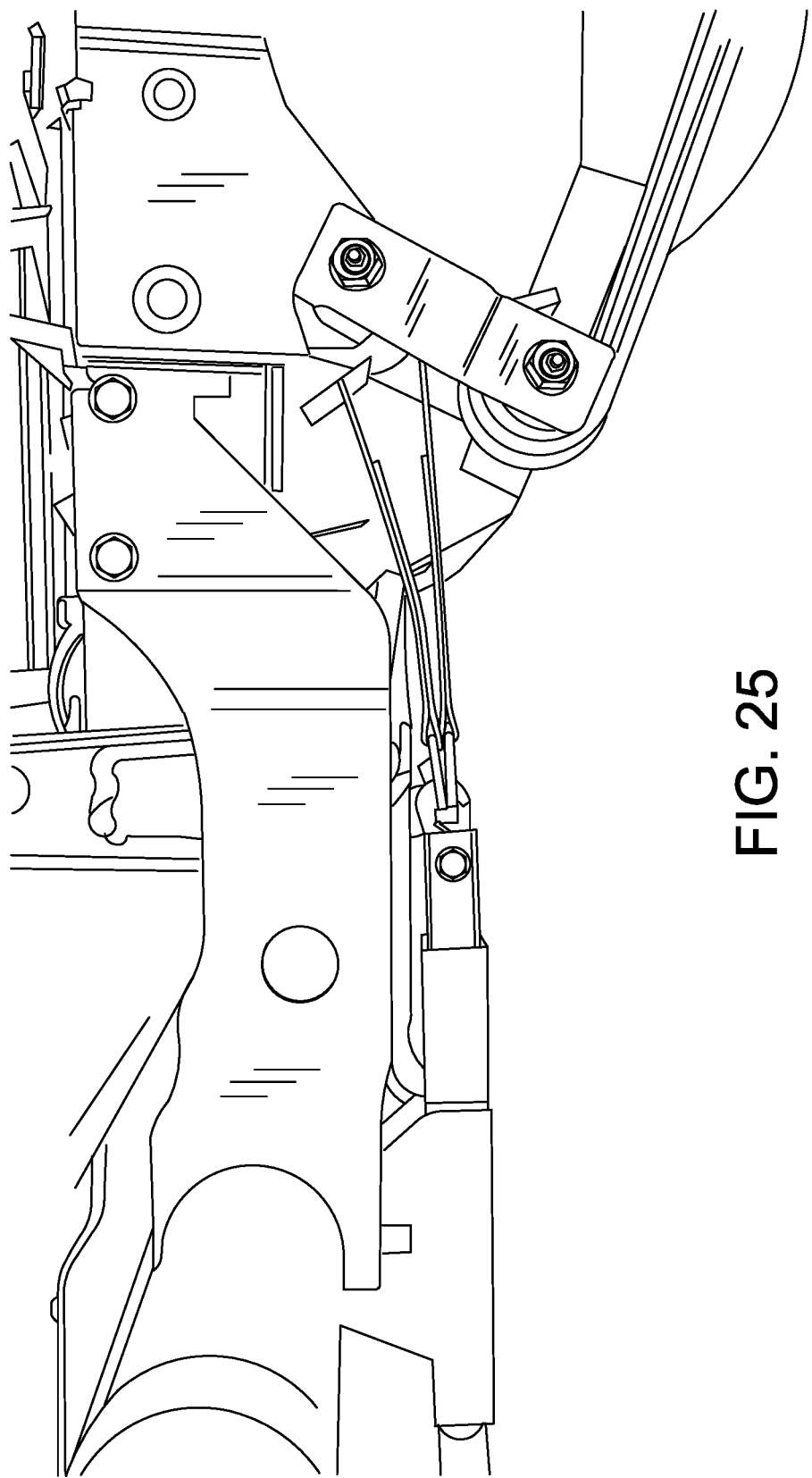
FIG. 25 is a photograph illustrating the frame mount assembly of FIG. 23 in ride configuration coupled to the frame of the vehicle with screw jack member and strap in place in accordance with one embodiment of the subject application.
Figure 26:
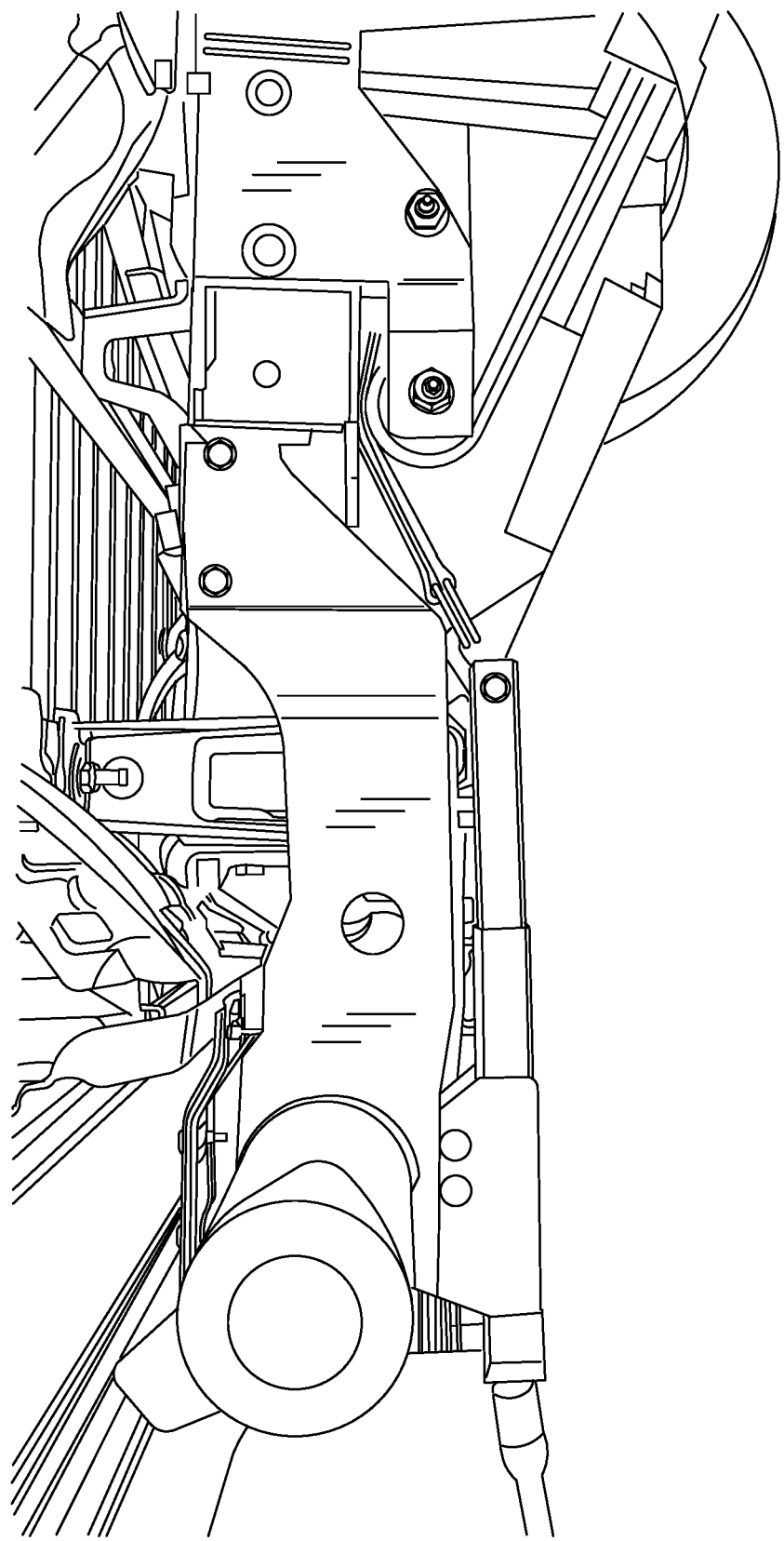
FIG. 26 is a photograph illustrating the frame mount assembly in transport configuration coupled to the frame of the vehicle with screw jack member and strap in place in accordance with one embodiment of the subject application.
Figure 27:
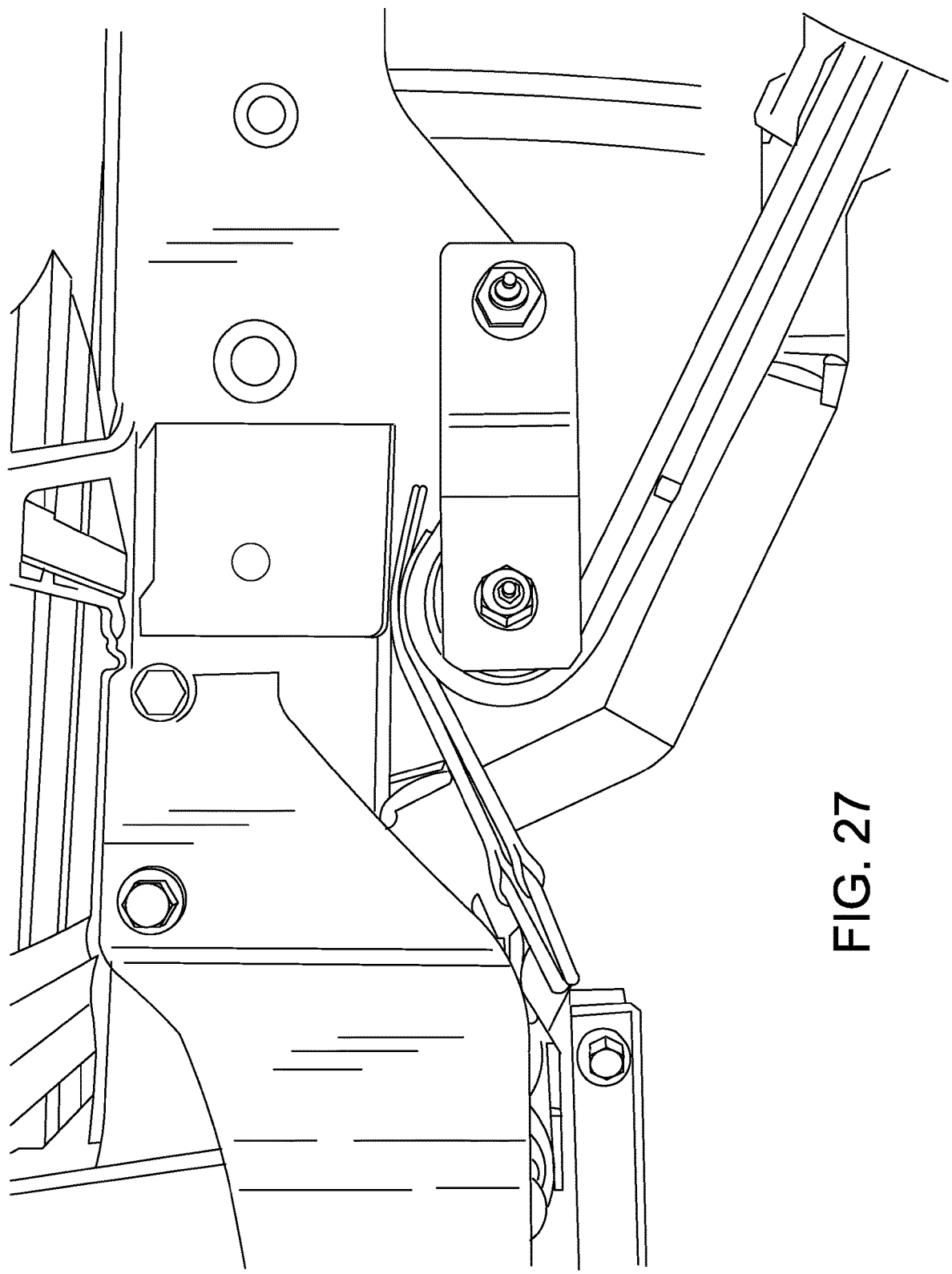
FIG. 27 is a photograph illustrating a close-up view of the frame mount assembly in transport configuration coupled to the frame of the vehicle with screw jack member and strap in place in accordance with one embodiment of the subject application.

When the vehicle is in ride configuration (see, e.g., the photographs of FIGS. 23-25, the screw jack member 20 is attached to the frame 8 and the strap 30 is wrapped around the top shackle mount 14 of the shackle 12 of the sliding frame mount assembly 10. FIG. 25 includes a photograph of the screw jack member 20 coupled to the vehicle, with the strap 30 secured to the hook 202 of the screw jack member 20 having looped around the top shackle mount 14. As the nut 214 is rotated to apply tension to the strap 30, which is transferred to pull the sliding frame mount assembly 10 back toward the rear of the vehicle by retracting the extension shaft 204 into the base member 210. Tension on the fasteners 112 is thereby relieved, and the fasteners may be removed. The nut 214 is then rotated in the opposite direction, allowing the extension shaft 204 to extend towards the front of the vehicle (shown in FIG. 26), reducing tension on the strap 30 and allowing the shackle 12 to rotate rearward, thereby reducing the height of the vehicle for transport. FIG. 27 provides a photograph illustrating this positioning of the sliding frame mount assembly 10. Furthermore, as shown in each of FIGS. 26-27, the sliding frame member 40A is visible, having been attached to the frame 8 and allowing the assembly 10 to freely move, once the fasteners 112 have been removed and the tension on the strap 30 relieved. Raising the vehicle back to ride configuration is a reverse of the process described above.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:
1. A sliding frame mount assembly, comprising:
a body;
a shackle, the shackle comprising a top shackle mount pivotally coupling the shackle to the body and a lower shackle mount configured to attach to an associated leaf spring;
wherein the body slideably engages an associated frame of an associated vehicle to raise and lower the associated vehicle via rotation of the shackle;
a first side portion;
a second side portion; and
a bottom portion, the first side portion and the second side portion are coupled to the bottom portion, extending perpendicularly upwards therefrom, wherein the first side portion and the second side portion respectively engage a first sliding frame member removably attached to a first side of the associated frame and a second sliding frame member removably attached to a second side of the associated frame;
wherein the first side portion includes a first tab opposite the bottom portion, extending perpendicularly outward from the first side portion away from the associated frame, and the second side portion includes a second tab opposite the bottom portion, extending perpendicularly outward from the second side portion away from the associated frame.

2. The sliding frame mount assembly of claim 1, wherein the body slideably engages the first and second sliding members.

3. The sliding frame mount assembly of claim 2, further comprising a bracket removably coupled to the first tab and the second tab, wherein the bracket extends across the associated frame.

4. A sliding frame mount assembly, comprising:
a body;
a shackle, the shackle comprising a top shackle mount pivotally coupling the shackle to the body and a lower shackle mount configured to attach to an associated leaf spring;
wherein the body slideably engages an associated frame of an associated vehicle to raise and lower the associated vehicle via rotation of the shackle;
a first side portion;
a second side portion; and
a bottom portion, the first side portion and the second side portion are coupled to the bottom portion, extending perpendicularly upwards therefrom, wherein the first side portion and the second side portion respectively engage a first sliding frame member removably attached to a first side of the associated frame and a second sliding frame member removably attached to a second side of the associated frame;
wherein the body is removably secured to the associated frame and the first and second side portions via at least one fastener.

5. The sliding frame mount assembly of claim 4, wherein the at least one fastener extends from the first side portion through the first sliding member and associated frame to the second side portion and second sliding member.

6. The sliding frame mount assembly of claim 5, further comprising an external stop positioned on the first side portion, the external stop configured to retain the at least one fastener in position when the sliding frame mount assembly is secured to the associated frame.

7. A system for vehicle height adjustment, comprising:
a sliding frame mount assembly, comprising:
a body, and a shackle, the shackle comprising a top shackle mount pivotally coupling the shackle to the body and a lower shackle mount configured to attach to a leaf spring;

wherein the body slideably engages an associated frame of an associated vehicle to raise and lower the associated vehicle via rotation of the shackle; and a screw jack member removably anchored to the associated frame and engaging the top shackle mount via a strap to adjust a position of the sliding frame mount assembly.

8. The system for vehicle height adjustment of claim 7, further comprising:

a first sliding frame member removably attached to a first side of the associated frame; and a second sliding frame member removably attached to a second side of the associated frame, wherein the body slideably engages the first and second sliding members.

9. The system for vehicle height adjustment of claim 8, wherein the screw jack member further comprises:

a base member, the base member having a first end and a distal end;

a threaded member positioned within the base member;

an extension shaft, threadably engaging the threaded member, the extension shaft configured to extend and retract into an interior of the base member; and a nut located at the distal end, wherein rotation of the nut extends or retracts the extension shaft in accordance with a direction of the rotation.

10. The system for vehicle height adjustment of claim 9, wherein the base member of the screw jack member further comprises an anchor component configured to removably attach the screw jack member to the associated frame.

11. The system for vehicle height adjustment of claim 10, wherein the extension shaft of the screw jack member further comprises a hook positioned on an end of the extension shaft, the hook configured to removably engage the strap.

12. The system for vehicle height adjustment of claim 8, wherein the body further comprises:

a first side portion;

a second side portion; and a bottom portion, the first side portion and the second side portion are coupled to the bottom portion, extending perpendicularly upwards therefrom, wherein the first side portion and the second side portion respectively engage the first sliding frame member and the second sliding frame member.

13. The system for vehicle height adjustment of claim 12, wherein the first side portion includes a first tab opposite the bottom portion, extending perpendicularly outward from the first side portion away from the associated frame, and the second side portion includes a second tab opposite the bottom portion, extending perpendicularly outward from the second side portion away from the associated frame.

14. The system for vehicle height adjustment of claim 13, further comprising a bracket removably coupled to the first tab and the second tab, wherein the bracket extends across the associated frame.

15. The system for vehicle height adjustment of claim 12, wherein the body is removably secured to the associated frame and the first and second side portions via at least one fastener.

16. The system for vehicle height adjustment of claim 15, wherein the at least one fastener extends from the first side portion through the first sliding member and associated frame to the second side portion and second sliding member.

17. The system for vehicle height adjustment of claim 16, further comprising an external stop positioned on the first side portion, the external stop configured to retain the at least one fastener in position when the sliding frame mount assembly is secured to the associated frame.

18. A method for transportation of a vehicle, comprising:

attaching a screw jack member to a frame of the vehicle;

securing a strap around a top shackle mount of a sliding frame mount assembly slideably engaging the frame;

rotating a threaded component of the screw jack member in a first direction to apply tension to the strap and to relieve tension on at least one fastener securing the sliding frame mount assembly to the frame;

removing the at least one fastener; and rotating the threaded component of the screw jack member in a second direction opposite the first direction to relieve tension on the strap, wherein the sliding frame mount assembly slides forward on the frame to lower the height of the vehicle.

* * * * *